(12) United States Patent
Yoshimura et al.

(10) Patent No.: US 11,999,850 B2
(45) Date of Patent: Jun. 4, 2024

(54) GLASS-FIBER-REINFORCED POLYAMIDE RESIN COMPOSITION AND MOLDED PRODUCT FOR VEHICLE INTERIOR OR VEHICLE EXTERIOR MADE THEREFROM

(71) Applicant: TOYOBO MC Corporation, Osaka (JP)

(72) Inventors: Nobuhiro Yoshimura, Shiga (JP); Ryo Umeki, Shiga (JP)

(73) Assignee: TOYOBO MC CORPORATION, Osaka (JP)

( * ) Notice: Subject to any disclaimer, the term of this patent is extended or adjusted under 35 U.S.C. 154(b) by 502 days.

(21) Appl. No.: 17/421,847

(22) PCT Filed: Feb. 12, 2020

(86) PCT No.: PCT/JP2020/005357
§ 371 (c)(1),
(2) Date: Jul. 9, 2021

(87) PCT Pub. No.: WO2020/170909
PCT Pub. Date: Aug. 27, 2020

(65) Prior Publication Data
US 2022/0098407 A1    Mar. 31, 2022

(30) Foreign Application Priority Data
Feb. 18, 2019 (JP) ................................ 2019-026448

(51) Int. Cl.
C08L 77/06        (2006.01)
(52) U.S. Cl.
CPC ........... *C08L 77/06* (2013.01); *C08L 2205/02* (2013.01); *C08L 2205/03* (2013.01)
(58) Field of Classification Search
CPC .. C08L 77/06; C08L 2205/02; C08L 2205/03; C07L 2205/02
See application file for complete search history.

(56) References Cited

U.S. PATENT DOCUMENTS

| | | | |
|---|---|---|---|
| 10,676,577 B2 * | 6/2020 | Tanaka | ..................... C08J 5/005 |
| 2003/0125440 A1 | 7/2003 | Tamura et al. | |
| 2018/0371185 A1 | 12/2018 | Tanaka et al. | |

FOREIGN PATENT DOCUMENTS

| | | |
|---|---|---|
| JP | 2000-273299 | 10/2000 |
| JP | 2001-98149 | 4/2001 |
| JP | 2002-284990 | 10/2002 |
| JP | 3442502 | 9/2003 |
| JP | 2010-189467 | 9/2010 |
| JP | 6172415 | 8/2017 |
| WO | 00/32693 | 6/2000 |
| WO | 2017/094696 | 6/2017 |
| WO | 2018/216770 | 11/2018 |

OTHER PUBLICATIONS

International Search Report (ISR) issued Apr. 28, 2020 in International (PCT) Application No. PCT/JP2020/005357, together with English translation thereof.
Extended European Search Report issued Mar. 13, 2023 in corresponding European Patent Application No. 20759458.1.

* cited by examiner

*Primary Examiner* — John E Uselding
(74) *Attorney, Agent, or Firm* — WENDEROTH, LIND & PONACK, L.L.P.

(57) ABSTRACT

The present invention aims to provide a glass-fiber-reinforced polyamide resin composition, characterized in that, the composition contains a crystalline aliphatic polyamide resin (A), an amorphous polyamide resin (B), an acrylic resin (C), mica (D), glass fiber (E) and a master batch of carbon black (F) in a ratio by mass of (17 to 30):(10 to 16):(3 to 8):(10 to 25):(20 to 50):(1 to 8), respectively, in that, a mass ratio of (A) and (B) ((B)/(A)) satisfies 0.50 to 0.61, and in that, the composition further contains a copper compound (G) in a rate of 0.005 to 1.0 part by mass when a total amount of the ingredients (A) to (F) is taken as 100 parts by mass. From the glass-fiber-reinforced polyamide resin composition, it is possible to obtain a molded product that is highly excellent in a surface appearance (textured surface uniformity) and has a weather resistance in a level being enough for maintaining an excellent surface appearance even after the weathering test.

4 Claims, No Drawings

GLASS-FIBER-REINFORCED POLYAMIDE RESIN COMPOSITION AND MOLDED PRODUCT FOR VEHICLE INTERIOR OR VEHICLE EXTERIOR MADE THEREFROM

TECHNICAL FIELD

The present invention relates to a glass-fiber-reinforced polyamide resin composition which can provide a molded product being highly excellent in an appearance and having an excellent weather resistance even under an outside condition, especially even under a use condition of being exposed to a rainfall.

BACKGROUND ART

A polyamide resin is excellent in a mechanical characteristic, a thermal property and a resistance to chemicals. Accordingly, it has been widely used as parts for automobiles, electric/electronic products, etc. In addition, a reinforced polyamide resin composition wherein polyamide is compounded with glass fiber exhibits a greatly improved mechanical characteristic, a greatly improved thermal property and a greatly improved resistance to chemicals. Therefore, investigations using the reinforced polyamide resin composition as a substitute material for metal have become brisk in view of a weight reduction, a rationalization of steps, etc.

Although a reinforced polyamide resin compounded with high concentrations of glass fiber, wollastonite, etc. can easily provide a molded product having a high rigidity, it is inferior in a weather resistance. Accordingly, an improvement is needed for using it outside. As to a method for improving the weather resistance, there have been proposals such as Patent Documents 1, 2 and 3.

In Patent Document 1, there is proposed a resin composition wherein poly-m-xylylene adipamide is compounded with an acrylic resin and an epoxy group-containing compound. In this resin composition, the epoxy group-containing compound is essential. Accordingly, a gel-like substance occurs or a melt fluidity lowers when a retention happens during a molding whereby an appearance of a molded product is deteriorated. In addition, a weather resistance is also insufficient. In Patent Document 2, there is proposed a resin composition comprising crystalline semi-aromatic polyamide as a main ingredient and further comprising glass fiber, wollastonite, carbon black and a copper compound. This resin composition has several deficiencies in terms of its production. Specifically, it is necessary to adopt a high molding resin temperature because the semi-aromatic polyamide is used as a main ingredient. In addition, a problem of abrasion of screw is unavoidable because wollastonite is compounded. When mica is compounded in place of wollastonite, it is impossible to sufficiently improve a weather resistance and to sufficiently prevent a fading in black color after exposure to a bad weather. Accordingly, there is yet a room for further improvements. In Patent Document 3, there is proposed a resin composition comprising a crystalline semi-aromatic polyamide as a main ingredient and further comprising glass fiber, wollastonite, specific carbon black and a copper compound. However, this resin composition has also the same deficiencies as those in Patent Document 2. In addition, it is necessary to use the specific carbon black. Further, when aliphatic polyamide is used as a main ingredient, it is impossible to sufficiently improve a weather resistance and to sufficiently prevent a fading in black color after exposure to a bad weather. Accordingly, there is yet a room for further improvements.

In order to solve the above-described problem, a glass-fiber-reinforced polyamide resin composition is proposed which can exhibit an excellent weather resistance by combining a crystalline aliphatic polyamide resin with an amorphous polyamide resin, an acrylic resin, mica, glass fiber, carbon black, and a copper compound in a specific ratio. A molded product obtained from the glass-fiber-reinforced polyamide resin composition proposed in the Patent Document 4 exhibits a weather resistance in a certain level. However, there maybe a case wherein an appearance and weather resistance of the molded product are not satisfactory in a high level.

PRIOR ART DOCUMENTS

Patent Documents

Patent Document 1: Japanese Patent No. 3442502
Patent Document 2: Japanese Patent Application Laid-Open (JP-A) No. 2000-273299
Patent Document 3: Japanese Patent Application Laid-Open (JP-A) No. 2002-284990
Patent Document 4: Japanese Patent No. 6172415

DISCLOSURE OF THE INVENTION

Problem that the Invention is to Solve

The glass-fiber-reinforced polyamide resin composition disclosed in the Patent Document 4 exhibits the weather resistance and appearance of the molded product in a level which is enough for satisfying the conventional market's request. However, it became clear that the weather resistance and appearance of the molded product obtained from the resin composition of the Patent Document 4 are not satisfactory, in order to satisfy the current market's high level of request, especially in order to satisfy a request for a textured surface uniformity for the molded product and a request for a high level of weather resistance which can maintain the excellent appearance of the molded product even if the molded product is exposed to a severe use environment.

The present invention has been created in view of such new problem. An object of the present invention is to provide a glass-fiber-reinforced polyamide resin composition which can prepare a molded product that is highly excellent in a surface appearance (textured surface uniformity) and has a weather resistance in a level being enough for maintaining an excellent surface appearance even under an outside condition, especially even under a use condition of being exposed to a rainfall.

Means for Solving the Problem

The inventors have conducted eager investigations for achieving the object. As a result, they have found that, by compounding a crystalline aliphatic polyamide resin, an amorphous polyamide resin, an acrylic resin, mica, glass fiber, carbon black and a copper compound in a specific ratio, it is possible to provide a glass-fiber-reinforced polyamide resin composition which can provide a molded product that is highly excellent in a surface appearance (textured surface uniformity) and has a weather resistance in a level being enough for maintaining an excellent surface appearance, whereupon the present invention has been accomplished.

Thus, the present invention adopts the following constitutions.

(1) A glass-fiber-reinforced polyamide resin composition, characterized in that, the composition contains a crystalline aliphatic polyamide resin (A), an amorphous polyamide resin (B), an acrylic resin (C), mica (D), glass fiber (E) and a master batch of carbon black (F) in a ratio by mass of (17 to 30):(10 to 16):(3 to 8):(10 to 25):(20 to 50):(1 to 8), respectively, in that, a mass ratio of (A) and (B) ((B)/(A)) satisfies 0.50 to 0.61, and in that, the composition further contains a copper compound (G) in a rate of 0.005 to 1.0 part by mass when a total amount of the ingredients (A) to (F) is taken as 100 parts by mass.

(2) The glass-fiber-reinforced polyamide resin composition according to (1), wherein the amorphous polyamide resin (B) is a semi-aromatic polyamide.

(3) A molded product for vehicle interior or vehicle exterior, characterized in that, the product is made from the glass-fiber-reinforced polyamide resin composition according to any of (1) or (2).

(4) The molded product for vehicle interior or vehicle exterior according to (3), wherein the product is selected from a group consisting of an outer handle, an outer door handle, a wheel cap, a roof rail, a door mirror base, a room mirror arm, a sunroof deflector, a radiator fan, a radiator grill, a bearing retainer, a console box, a sun visor arm, a spoiler and a slide door rail cover.

Advantages of the Invention

The glass-fiber-reinforced polyamide resin composition of the present invention can provide a molded product that is highly excellent in a surface appearance (textured surface uniformity) and has a weather resistance in a level being enough for maintaining an excellent surface appearance even under an outside condition, especially even under a use condition of being exposed to a rainfall.

BEST MODE FOR CARRYING OUT THE INVENTION

Hereinafter, the present invention will be described in more detail. First, components used in the present invention will be described.

In the present invention, whether the polyamide resin is crystalline or amorphous is determined as follows. A polyamide resin exhibiting a clear melting point peak is crystalline and a polyamide resin not exhibiting a clear melting point peak is amorphous when a polyamide resin is measured by DSC in accordance with JIS K 7121:2012 at a temperature elevation rate of 20° C./min.

The glass-fiber-reinforced polyamide resin composition of the present invention contains a crystalline aliphatic polyamide resin (A), an amorphous polyamide resin (B), an acrylic resin (C), mica (D), glass fiber (E) and a master batch of carbon black (F) in a ratio by mass of (17 to 30):(10 to 16):(3 to 8):(10 to 25):(20 to 50):(1 to 8), respectively, wherein a mass ratio of (A) and (B) ((B)/(A)) needs to satisfy 0.50 to 0.61. In addition, glass-fiber-reinforced polyamide resin composition of the present invention further contains a copper compound (G) in a rate of 0.005 to 1.0 part by mass when the total amount of the ingredients (A) to (F) is taken as 100 parts by mass.

As to the crystalline aliphatic polyamide resin (A), there are exemplified a polyamide resin prepared by polycondensation of raw materials such as lactam, ω-aminocarboxylic acid, dicarboxylic acid, diamine, etc. or a copolymer, a blended product or the like thereof. As to the lactam and the ω-aminocarboxylic acid, there are exemplified ε-caprolactam, 6-aminocaproic acid, ω-enantholactam, 7-aminoheptanoic acid, 11-aminoundecanoic acid, 9-aminononanoic acid, α-pyrrolidone and α-piperidine. As to the dicarboxylic acid, there are exemplified glutaric acid, adipic acid, azelaic acid, sebacic acid and suberic acid. As to the diamine, there are exemplified tetramethylenediamine, hexamethylenediamine, octamethylenediamine, decamethylenediamine, undecamethylenediamine and dodecamethylenediamine. As to specific examples of the crystalline aliphatic polyamide resin (A), polyamide 6, polyamide 12, polyamide 66, polyamide 46, polyamide 610, polyamide 612, and polyamide 1010 are preferred.

The relative viscosity of the crystalline aliphatic polyamide resin (A) (96% sulfuric acid method) is preferred to be in a range of 1.7 to 2.5. It is more preferred to be in a range of 1.8 to 2.2 and further preferred to be in a range of 1.9 to 2.1. When the relative viscosity falls within this range, toughness and fluidity as resin can be satisfied.

A compounding rate of the crystalline aliphatic polyamide resin (A) is 17 to 30 parts by mass, preferably 18 to 28 parts by mass, and more preferably 20 to 25 parts by mass when a total amount of the ingredient (A) and the ingredients (B) to (F) in the glass-fiber-reinforced polyamide resin composition of the present invention is taken as 100 parts by mass.

The amorphous polyamide resin (B) is a polyamide resin which exhibits no melt peak of crystals in a thermogram in a measurement of DSC. As to dicarboxylic acid which is a constituting ingredient, there are exemplified terephthalic acid, isophthalic acid, adipic acid and sebacic acid. As to diamine, there are exemplified tetramethylenediamine, hexamethylenediamine, m-xylylenediamine, p-xylylenediamine, undecamethylenediamine, dodecamethylenediamine, 2-methylpentamethylenediamine, trimethylhexamethylenediamine, aminoethylpiperazine and bisaminomethylcyclohexane. Among them, a semi-aromatic polyamide is preferred in order to simultaneously satisfy a high bending elastic modulus and a high shock resistance. As to the semi-aromatic polyamide, examples of the preferred ones are polyamide 6T/6I prepared from terephthalic acid, isophthalic acid and hexamethylenediamine as materials, polyamide 6T/66 prepared from terephthalic acid, adipic acid and hexamethylenediamine as materials. As to the amorphous polyamide resin (B), polyamide 6T/6I is especially preferred.

As to the relative viscosity of the amorphous polyamide resin (B) (96% sulfuric acid method), there is no particular limitation therefor. It is preferred to be in a range of 1.6 to 2.4 and more preferred to be in a range of 1.7 to 2.3.

A compounding rate of the amorphous polyamide resin (B) is 10 to 16 parts by mass, preferably 10 to 15 parts by mass, and more preferably 11 to 15 parts by mass when a total amount of the ingredients (A) and (B) and the ingredients (C) to (F) in the glass-fiber-reinforced polyamide resin composition of the present invention is taken as 100 parts by mass.

The mass ratio of (A) and (B) ((B)/(A)) needs to satisfy 0.50 to 0.61. The mass ratio ((B)/(A)) is preferred to be 0.51 to 0.60. When the content of crystalline aliphatic polyamide resin (A) and the content of amorphous polyamide resin (B) satisfy the above ranges and the mass ratio ((B)/(A)) satisfies the above range, it is possible to obtain a polyamide resin composition which is excellent in a melt-extrusion property, mechanical property, and thermal property. As a result, the molded product obtained from the polyamide resin composition can exhibit highly excellent appearance (textured surface uniformity). Also, when the mass ratio ((B)/(A)) is within the range of 0.50 to 0.61, it is possible to express a high level of elasticity, which results in a stable strand production.

As result of compounding the crystalline aliphatic polyamide resin (A) with the amorphous polyamide resin (B) as mentioned above, an effect of improving the weather resistance becomes high. The reason therefor is presumed to be due to changes in a dispersing property and a compatibility of the acrylic resin (C).

As to the acrylic resin (C), there are exemplified a homopolymer and a copolymer of methacrylate. It is preferred that the copolymer contains 50% by mass or more of methacrylate. It is more preferred that the copolymer contains 70% by mass or more of methacrylate. As to the methacrylate monomer, specific examples thereof are alkyl methacrylate (such as methyl methacrylate, ethyl methacrylate, propyl methacrylate and butyl methacrylate) and a derivative of alkyl methacrylate wherein hydrogen of an alkyl group is substitute with hydroxyl group, amino group, etc. (such as β-hydroxyethyl methacrylate and N,N-dimethylaminoethyl methacrylate). As to a monomer which is copolymerizable to the methacrylate monomer, there are exemplified vinyl monomers such as methyl acrylate, styrene, α-methylstyrene and acrylonitrile. Particularly preferred ones among the acrylic resin (C) as such are methyl polymethacrylate and ethyl polymethacrylate.

With regard to a melt fluidity of the acrylic resin (C), a melt flow rate (MFR) under a condition of 230° C. and 37.3 N is preferred to be 5 g/10 min or more, more preferred to be 10 g/10 min or more, and further preferred to be 15 g/10 min or more.

A compounding rate of the acrylic resin (C) is 3 to 8 parts by mass, preferably 3 to 7 parts by mass, and more preferably 4 to 6 parts by mass when a total amount of the ingredients (A) to (C) and the ingredients (D) to (F) in the glass-fiber-reinforced polyamide resin composition of the present invention is taken as 100 parts by mass. When the compounding rate of the acrylic resin (C) is within the above range, the molded product obtained from the polyamide resin composition can exhibit not only highly excellent appearance (textured surface uniformity), but also more excellent weather resistance.

In the glass-fiber-reinforced polyamide resin composition of the present invention, it is preferred that the compounding rate of the acrylic resin (C) to a total amount (100 parts by mass) of the polyamide resins (A) and (B) is 7 to 25 parts by mass. When the compounding rate of the acrylic resin (C) is less than the above range, there is a tendency that an effect of improving the weather resistance becomes small. On the other hand, when it is more than the above range, there is a tendency that a strength, a rigidity, a resistance to solvents and a heat resistance largely decrease.

As to the mica (D), there are exemplified white mica, gold mica, black mica and artificial mica. Any of them may be used. It is preferred that when a shape of mica is approximated to an elliptic shape and a mean value of a long diameter and a short diameter is defined as a particle size, the particle size of mica is about 1 to 30 μm in view of a balance between an appearance and a rigidity.

A compounding rate of the mica (D) is 10 to 25 parts by mass and preferably 15 to 22 parts by mass when a total amount of the ingredients (A) to (D) and the ingredients (E) and (F) in the glass-fiber-reinforced polyamide resin composition of the present invention is taken as 100 parts by mass. When the compounding rate of the mica (D) is less than the above range, there is a tendency that an effect of improving the appearance of molded product becomes small. On the other hand, when it is more than the above range, there is a tendency that a fluidity and a mechanical strength become inferior.

A cross section of the glass fiber (E) may be either circular or flat. Glass fiber having a flat cross section includes a one wherein a cross section being vertical to a lengthwise direction of the fiber is nearly elliptic, nearly long circular or nearly cocoon shape, and a flatness degree thereof is preferably 1.5 to 8 and more preferably 2 to 5. Here, the term "flatness degree" is a ratio of a long diameter to a short diameter when a rectangle with the smallest area contacting an outside of the cross section vertical to the lengthwise direction of the glass fiber is supposed and a length of a long side of this rectangle is named the long diameter and a length of a short side thereof is named the short diameter. When the flatness degree is less than the above range, there is no big difference in terms of a shape from glass fiber having a circular cross section and, therefore, there are some cases wherein an impact resistance of the molding product is not so much enhanced. On the other hand, when the flatness degree is more than the above range, a bulk density in the polyamide resin is high and, therefore, there are some cases wherein the glass fiber cannot be uniformly dispersed in the polyamide and there are also some cases wherein an impact resistance of the molded product is not so much enhanced. In the present invention, when the glass fiber has the nearly long circular cross section and has the flatness degree of 2 to 5, it is possible to express a higher mechanical property.

A compounding rate of the glass fiber (E) is 20 to 50 parts by mass, preferably 25 to 45 parts by mass, and more preferably 30 to 45 parts by mass when a total amount of the ingredients (A) to (E) and the ingredient (F) in the glass-fiber-reinforced polyamide resin composition of the present invention is taken as 100 parts by mass. When the compounding rate of the glass fiber (E) is less than the above range, there is a tendency that a rigidity of the molded product becomes insufficient. On the other hand, when it is more than the above range, there is a tendency that a reinforcing effect is not achieved in proportional to the compounded amount.

In preparing a glass-fiber-reinforced polyamide resin composition according to the present invention, it is preferred that a polyamide-reactive silane coupling agent is added in an amount of 0.1 to 1.0% by mass of the glass fiber (E), particularly when the glass fiber has a flat cross section. As to a converging agent for a chopped strand for the polyamide, a small amount of a silane coupling agent is previously contained in a fiber bundle in order to improve an adhesive property to a matrix resin. However, there is an upper limit for an amount of the amino silane coupling agent which can be previously added to the fiber bundle so as to avoid a poor opening of the fiber bundle during an extrusion. Therefore, it is preferred to further add a shortfall separately.

As to the carbon black in the master batch of carbon black (F), there is no particular limitation therefor. There are exemplified thermal black, channel black, acetylene black, Ketjen black and furnace black. As to the carbon black (F), a preferred one is that wherein an average particle size is within a range of from 10 to 40 μm, a specific surface by means of a BET adsorption method is within a range of from 50 to 300 $m^2/g$ and an oil absorbing amount when dibutyl phthalate is used is within a range of from 50 cc/100 g to 150 cc/100 g. The content of carbon black in the master batch is preferred to be 30 to 60% by mass.

As to the base resin of the master batch of carbon black (F), there are exemplified various kinds of polyethylene represented by low-density polyethylene (LDPE), high-density polyethylene (HDPE), ultrahigh-molecular weight polyethylene (UHMWPE), etc. and, in addition, a polyethylene resin such as a copolymer of ethylene with α-olefin (e.g., a random copolymer and a block copolymer of ethylene with propylene and a random copolymer and a block copolymer of ethylene with butene), a copolymer of ethylene with unsaturated carboxylate (e.g., ethylene-methacrylate and ethylene-butyl acrylate) and a copolymer of ethylene with aliphatic vinyl compound (e.g., ethylene with vinyl acetate); as well as a homopolymer (e.g., polystyrene, poly (α-methylstyrene) and poly(p-methylstyrene)), a copolymer of styrene with acrylonitrile (AS resin) and a copolymer of styrene monomer with maleimide monomer (e.g. maleimide or N-phenylmaleimide) or with acrylamide monomer (e.g., acrylamide).

A compounding rate of the master batch of carbon black (F) is 1 to 8 parts by mass, preferably 2 to 6 parts by mass, and more preferably 3 to 6 parts by mass when a total amount of the ingredients (A) to (F) in the glass-fiber-reinforced polyamide resin composition of the present invention is taken as 100 parts by mass. A compounding rate of the carbon black itself is preferably 0.3 to 4.5 part(s) by mass and more preferably 0.5 to 3.0 part(s) by mass. When the compounding rate of the master batch of carbon black (F) is less than the above range, there is a tendency that a contribution to the whether resistance becomes small. On the other hand, when it is more than the above range, there is a tendency that a mechanical strength and a rigidity are deteriorated.

As to the copper compound (G), examples are copper chloride, copper bromide, copper iodide, copper acetate, copper acetylacetonate, copper carbonate, copper borofluoride, copper citrate, copper hydroxide, copper nitrate, copper sulfate and copper oxalate. In the glass-fiber-reinforced polyamide resin composition of the present invention, a content of the copper compound (G) is 0.005 to 1.0 part by mass and preferably 0.01 to 0.5 part by mass when a total amount of the ingredients (A) to (F) in the glass-fiber-reinforced polyamide resin composition of the present invention is taken as 100 parts by mass. When the content of the copper compound (G) is less than the above range, there is a tendency that a resistance to thermal deterioration is inferior. On the other hand, even when it is more than the above range, no more improvement in the resistance to thermal deterioration is noted but there is a tendency that physical properties lower.

It is also possible in the present invention to add an alkali halide compound as a stabilizer in a manner of joint use with the copper compound. Examples of such an alkali halide compound are lithium bromide, lithium iodide, potassium bromide, potassium iodide, sodium bromide and sodium iodide. A particularly preferred one is potassium iodide.

Moreover, in the glass-fiber-reinforced polyamide resin composition according to the present invention, in addition to the above essential ingredients (A) to (G), it is possible to add an optional ingredient such as a fibrous reinforcement material, an inorganic filler, a phenol-type antioxidant and a phosphorus-type antioxidant as a stabilizer to light or heat, a mold-releasing agent, a crystal nucleus agent, a lubricant, a flame retardant, an antistatic agent, a pigment, a dye, etc. within such an extent that it does not deteriorate the characteristic feature of the present invention. In the glass-fiber-reinforced polyamide resin composition of the present invention, a total amount of the optional ingredients other than the essential ingredients (A) to (G) is preferred to be 10% by mass in maximum. In the glass-fiber-reinforced polyamide resin composition of the present invention, a total amount of the essential components (A) to (G) occupies preferably 90% by mass or more, and more preferably 95% by mass or more. Further, in view of a whether resistance, it is preferred that a content of wollastonite is 5 parts by mass or less when a total amount of the ingredients (A) to (F) in the glass-fiber-reinforced polyamide resin composition of the present invention is taken as 100 parts by mass. It is more preferred that no wollastonite is contained therein.

There is no particular limitation for a method of producing the glass-fiber-reinforced polyamide resin composition of the present invention. Each of the ingredients may be melted and kneaded by a known kneading method to give the composition. There is also no limitation for a specific kneading apparatus. Although an uniaxial or biaxial extruder, a kneading machine, a kneader, etc. may be exemplified, the biaxial extruder is particularly preferred in view of a productivity. Although there is also no particular limitation for a screw arrangement, it is preferred to provide a kneading zone so that each of the ingredients is more uniformly dispersed. As to a specific method therefor, there is exemplified a method wherein a mixture of the polyamide resins (A) and (B) and the acrylic resin (C) is preblended together with the master batch of carbon black (F), the copper compound (G) and with other optional ingredients using a blender and poured into a uniaxial or biaxial extruder from a hopper; then the mica (D) and the glass fiber (E) are poured into a melted mixture in the uniaxial or biaxial kneader using a feeder under a state wherein at least a part of the polyamide resins (A) and (B), and the acrylic resin (C) are melted and; after the melting and kneading thereof, it is blown out into a strand form followed by cooling and cutting.

Since the glass-fiber-reinforced polyamide resin composition of the present invention is prepared according to the above-mentioned compounding rate, it is characterized in having an excellent weather resistance as shown below. Thus, a color difference ΔE before and after the weathering test (according to JIS K-7350-2) using a xenon weatherometer is 3.5 or less, preferably 2.5 or less, and more preferably 2.0 or less. Details of the weathering test are in accordance with a procedure given in the Examples which will be mentioned later. Due to a fact that the color difference ΔE is the above value or less, it is now possible to resist an outdoor use being exposed to rainfall.

EXAMPLES

The present invention will now be illustrated in more detail as hereunder by Examples. However, the present invention is not limited to the following Examples so far as it does not exceed a gist thereof. Measurement of physical data in the Examples was carried out in accordance with the following methods.

(1) Relative Viscosity of Polyamide Resin:

A polyamide resin (0.25 g) was dissolved in 25 ml of 96 wt % sulfuric acid, and 10 ml of a resulting solution was placed in an Oswald viscometer. A measurement was conducted at 20° C. Relative viscosity was calculated according to the following formula.

$$RV = T/T0$$

RV: Relative viscosity, T: Dropping time of a sample solution, T0: Dropping time of a solvent (2) Bending Strength and Bending Elastic Modulus:

Bending strength and bending elastic modulus were measured in accordance with ISO 178.

(3) Textured Surface Uniformity:

A molded product having a thickness of 2.5 mm was prepared by an injection molding machine (IS 80 manufactured by Toshiba Machinery), using a plate-like mold which has been subjected to a texturing treatment (a depth of texture: 30 μm), at a resin temperature of 285° C. and a mold temperature of 80° C. The textured surface uniformity of the prepared molded product was judged by naked eyes.

[Judgement Criteria]
ο: Transfer of the texture was good over the whole surface, and there was no gloss spot.
Δ: Although transfer of the texture was good over the whole surface, there were partial gloss spots.
×: Transfer of the texture partially differs, and there were gloss spots.

(4) Evaluation of Weather Resistance:

Color difference ΔE: The molded product which was prepared in the above (3) and which has a textured surface was subjected to a weathering test in accordance with JIS K 7350-2 using a xenon weatherometer (XL 75 manufactured by Suga Shikenki KK) under the following conditions:
black panel temperature: 63±2° C.
relative humidity: 50±5%
irradiation method: rainfall for 18 minutes during 120 minutes (being sprinkled with water)
irradiation time: 1250 hours
irradiation degree: 60 W/m²·S with 300 to 400 nm wavelength
optical filters: quartz (inside) and borosilicate #275 (outside).

For the molded product having a textured surface before and after the weathering test, value of "L", "a" and "b" were measured using TC-1500 SX (spectrophotometer manufactured by Tokyo Denshoku) whereupon the color difference ΔE was calculated.

Surface appearance of the molded product after the weathering test (to check whether a reinforcement material was lifted) was judged according to the following criteria:

[Judgement Criteria]
ο: No lifting of the reinforcement material was noted.
Δ: Lifting of the reinforcement material was slightly noted.
×: Lifting of the reinforcement material was noted.

State of texture on the surface of the molded product after the weathering test was judged according to the following criteria:

[Judgement Criteria]
ο: Textured pattern was clearly noted.
Δ: Textured pattern was partially unclear.
×: Textured pattern was unclear.

The materials used are listed as follows:
Crystalline Aliphatic Polyamide Resin (A)
PA6: Polyamide 6; "M2000" manufactured by GUANGDONG XINHUI MEIDA NYLON CO., LTD.; relative viscosity of 2.0
PA66: Polyamide 66; "Stabamide 23AE" manufactured by Rhodia; relative viscosity of 2.4
Amorphous Polyamide Resin (B)
G21: Polyamide 6T6I; "Grivory G21" manufactured by Ems; relative viscosity of 2.0
G16: Polyamide 6T6I; "Grivory G16" manufactured by Ems; relative viscosity of 1.8
Acrylic Resin (C)
Poly(methyl methacrylate) "Parapet GF" manufactured by Kuraray
Mica (D)
"S-325" manufactured by Repco
Glass Fiber (E)
"T-275H" manufactured by Nippon Electric Glass Co., Ltd. (a chopped strand of glass fiber having a circular cross section: diameter 11 μm)
Master Batch of Carbon Black (F)
"EPC-840" manufactured by SUMIKA COLOR CO., LTD., base resin LDPE resin, containing 43% by mass of carbon black
Copper Compound (G)
Cupric bromide: Manufactured by Wako Pure Chemicals; purity: 99.9%

Examples 1 to 9 and Comparative Examples 1 to 4

Ingredients other than the mica (D) and the glass fiber (E) were subjected to a dry blending under compounding ratios as shown in Table 1, and then subjected to a melt mixing under an extruding condition wherein a cylinder temperature was 280° C. and a screw revolution was 250 rpm, using a biaxial extruder "STS 35 mm" manufactured by Coperion which was a biaxial extruder of a bent type constituted from 12 blocks of barrel. After that, the mica (D) and the glass fiber (E) were fed by a side feeding method to conduct a melt kneading. Strand extruded from the extruder was quickly cooled and made into pellets using a strand cutter. The resulting pellets were dried at 100° C. for 12 hours, then molded into a textured flat plate using an injection molding machine (IS 80 manufactured by Toshiba Machine Co., Ltd.) at a cylinder temperature of 285° C. and a mold temperature of 90° C. The resulting test pieces were subjected to evaluations. Results of the evaluations are also mentioned in Table 1.

TABLE 1

| | | Unit | Example 1 | Example 2 | Example 3 | Example 4 | Example 5 |
|---|---|---|---|---|---|---|---|
| Compounding rate | crystalline aliphatic polyamide resin (A) PA6 | part(s) by mass | 21.5 | 22.5 | 21.5 | 24 | 21.5 |
| | crystalline aliphatic polyamide resin (A) PA66 | part(s) by mass | 0 | 0 | 0 | 0 | 0 |
| | amorphous polyamide resin (B) G21 | part(s) by mass | 12.5 | 11.5 | 13 | 14.5 | 12.5 |
| | amorphous polyamide resin (B) G16 | part(s) by mass | 0 | 0 | 0 | 0 | 0 |
| | acrylic resin (C) | part(s) by mass | 4 | 4 | 4 | 3.5 | 4 |
| | mica (D) | part(s) by mass | 20 | 20 | 20 | 20 | 16 |
| | glass fiber (E) | part(s) by mass | 37.5 | 37.5 | 37.5 | 33.5 | 41.5 |
| | master batch of carbon black (F) | part(s) by mass | 4.5 | 4.5 | 4 | 4.5 | 4.5 |
| | copper compound (G) | part(s) by mass | 0.02 | 0.02 | 0.02 | 0.02 | 0.02 |
| | (B)/(A) | — | 0.58 | 0.51 | 0.60 | 0.60 | 0.58 |

TABLE 1-continued

| | | | | | | | |
|---|---|---|---|---|---|---|---|
| Results of evaluations | bending strength | MPa | 280 | 280 | 280 | 275 | 290 |
| | bending elastic modulus | GPa | 18 | 18 | 18 | 17 | 19 |
| | textured surface uniformity | — | ○ | ○ | ○ | ○ | ○ |
| | weather resistance color difference ΔE | — | 2.0 | 2.0 | 2.0 | 2.3 | 2.0 |
| | lifting of reinforcement material | — | ○ | ○ | ○ | ○ | ○ |
| | state of texture after the test | — | ○ | ○ | ○ | ○ | ○ |

| | | Unit | Example 6 | Example 7 | Example 8 | Example 9 |
|---|---|---|---|---|---|---|
| Compounding rate | crystalline aliphatic polyamide resin (A) PA6 | part(s) by mass | 20.5 | 21.5 | 0 | 21.5 |
| | crystalline aliphatic polyamide resin (A) PA66 | part(s) by mass | 0 | 0 | 21.5 | 0 |
| | amorphous polyamide resin (B) G21 | part(s) by mass | 11.5 | 12.5 | 12.5 | 0 |
| | amorphous polyamide resin (B) G16 | part(s) by mass | 0 | 0 | 0 | 12.5 |
| | acrylic resin (C) | part(s) by mass | 6 | 4 | 4 | 4 |
| | mica (D) | part(s) by mass | 20 | 21 | 20 | 20 |
| | glass fiber (E) | part(s) by mass | 37.5 | 38.5 | 37.5 | 37.5 |
| | master batch of carbon black (F) | part(s) by mass | 4.5 | 2.5 | 4.5 | 4.5 |
| | copper compound (G) | part(s) by mass | 0.02 | 0.02 | 0.02 | 0.02 |
| | (B)/(A) | — | 0.56 | 0.58 | 0.58 | 0.58 |
| Results of evaluations | bending strength | MPa | 280 | 285 | 280 | 280 |
| | bending elastic modulus | GPa | 18 | 18 | 18 | 18 |
| | textured surface uniformity | — | ○ | ○ | ○ | ○ |
| | weather resistance color difference ΔE | — | 1.3 | 2.1 | 2.0 | 2.0 |
| | lifting of reinforcement material | — | ○ | ○ | ○ | ○ |
| | state of texture after the test | — | ○ | ○ | ○ | ○ |

| | | Unit | Comparative Example 1 | Comparative Example 2 | Comparative Example 3 | Comparative Example 4 |
|---|---|---|---|---|---|---|
| Compounding rate | crystalline aliphatic polyamide resin (A) PA6 | part(s) by mass | 23.5 | 24 | 23.5 | 21.5 |
| | crystalline aliphatic polyamide resin (A) PA66 | part(s) by mass | 0 | 0 | 0 | 0 |
| | amorphous polyamide resin (B) G21 | part(s) by mass | 10.5 | 14.5 | 14.5 | 17 |
| | amorphous polyamide resin (B) G16 | part(s) by mass | 0 | 0 | 0 | 0 |
| | acrylic resin (C) | part(s) by mass | 4 | 2 | 4 | 2 |
| | mica (D) | part(s) by mass | 20 | 20 | 20 | 20 |
| | glass fiber (E) | part(s) by mass | 37.5 | 35 | 35 | 37.5 |
| | master batch of carbon black (F) | part(s) by mass | 4.5 | 4.5 | 3 | 2 |
| | copper compound (G) | part(s) by mass | 0.02 | 0.02 | 0.02 | 0.02 |
| | (B)/(A) | — | 0.45 | 0.60 | 0.62 | 0.79 |
| Results of evaluations | bending strength | MPa | 280 | 278 | 280 | 283 |
| | bending elastic modulus | GPa | 18 | 18 | 18 | 18 |
| | textured surface uniformity | — | x | ○ | Δ | Δ |
| | weather resistance color difference ΔE | — | 2.0 | 3.1 | 2.1 | 3.7 |
| | lifting of reinforcement material | — | Δ | Δ | Δ | x |
| | state of texture after the test | — | x | Δ | Δ | x |

From Table 1, it is noted that, in the test pieces of Examples 1 to 9, the color difference (ΔE before and after the weathering test is small, the surface appearance (textured surface uniformity) is highly excellent, and the weather resistance is in a level being enough for maintaining the excellent surface appearance even after the weathering test. On the contrary, in the test piece of Comparative Example 1, the surface appearance (textured surface uniformity) is not satisfactory. In the test piece of Comparative Example 2, although the surface appearance (textured surface uniformity) is excellent, such excellent surface appearance cannot be maintained any longer after the weathering test. In the test pieces of Comparative Examples 3 and 4, the surface appearance (textured surface uniformity) is rather inferior, and the surface appearance cannot be maintained any longer after the weathering test.

INDUSTRIAL APPLICABILITY

The glass-fiber-reinforced polyamide resin composition of the present invention is suitably used for vehicle interior or vehicle exterior such as an outer handle, an outer door handle, a wheel cap, a roof rail, a door mirror base, a room mirror arm, a sunroof deflector, a radiator fan, a radiator grill, a bearing retainer, a console box, a sun visor arm, a spoiler and a slide door rail cover.

The invention claimed is:

1. A glass-fiber-reinforced polyamide resin composition, comprising a crystalline aliphatic polyamide resin (A), an amorphous polyamide resin (B), an acrylic resin (C), mica (D), glass fiber (E) and a master batch of carbon black (F) in a ratio by mass of (17 to 30):(10 to 16):(3 to 8):(10 to 25):(20 to 50):(1 to 8), respectively, wherein a mass ratio of (A) and (B) ((B)/(A)) satisfies 0.50 to 0.61, and wherein the composition further comprises a copper compound (G) in an amount of 0.005 to 1.0 part by mass when a total amount of (A), (B), (C), (D), (E) and (F) is taken as 100 parts by mass.

2. The glass-fiber-reinforced polyamide resin composition according to claim 1, wherein the amorphous polyamide resin (B) is a semi-aromatic polyamide.

3. A molded product for a vehicle interior or a vehicle exterior, wherein the product is made from the glass-fiber-reinforced polyamide resin composition according to claim 1.

4. The molded product for the vehicle interior or the vehicle exterior according to claim 3, wherein the product is at least one selected from the group consisting of an outer handle, an outer door handle, a wheel cap, a roof rail, a door mirror base, a room mirror arm, a sunroof deflector, a radiator fan, a radiator grill, a bearing retainer, a console box, a sun visor arm, a spoiler and a slide door rail cover.

* * * * *